US012685275B1

(12) United States Patent
Fasula

(10) Patent No.: US 12,685,275 B1
(45) Date of Patent: Jul. 21, 2026

(54) INTEGRATED ECOSYSTEM FOR SIMULTANEOUS CULTIVATION OF SOIL BIOLOGY AND PLANTS

(71) Applicant: Edward Joseph Fasula, Santa Fe, NM (US)

(72) Inventor: Edward Joseph Fasula, Santa Fe, NM (US)

( * ) Notice: Subject to any disclaimer, the term of this patent is extended or adjusted under 35 U.S.C. 154(b) by 0 days.

(21) Appl. No.: 18/947,553

(22) Filed: Nov. 14, 2024

Related U.S. Application Data

(60) Provisional application No. 63/538,392, filed on Sep. 14, 2023.

(51) Int. Cl.
  *A01G 27/06* (2006.01)
  *A01G 9/02* (2018.01)
  (Continued)

(52) U.S. Cl.
  CPC .............. *A01G 27/06* (2013.01); *A01G 9/02* (2013.01); *A01G 18/10* (2018.02); *A01G 25/06* (2013.01)

(58) Field of Classification Search
  CPC ........ A01G 25/06; A01G 18/10; A01G 18/20; A01G 9/02
  See application file for complete search history.

(56) References Cited

U.S. PATENT DOCUMENTS

| | | | | | |
|---|---|---|---|---|---|
| 6,237,283 | B1 * | 5/2001 | Nalbandian | .......... | A01G 27/006 |
| | | | | | 47/79 |
| 6,709,198 | B2 * | 3/2004 | Wachtel | ................. | A01G 25/06 |
| | | | | | 405/51 |

(Continued)

FOREIGN PATENT DOCUMENTS

| | | | | | |
|---|---|---|---|---|---|
| CN | 107258360 | A | * | 10/2017 | ............... A01G 9/02 |
| CN | 112913612 | A | * | 6/2021 | ............. A01G 22/25 |

(Continued)

OTHER PUBLICATIONS

Ingham, E. R., The Soil Food Web: Its Importance in Ecosystem Health Soil Biology Primer, USDA Natural Resources Conservation Service, 2000.

(Continued)

*Primary Examiner* — Joshua D Huson
*Assistant Examiner* — Katherine Anne Kloecker
(74) *Attorney, Agent, or Firm* — Plager Schack LLP; Mark H. Plager; Naomi Mann

(57) ABSTRACT

An integrated ecological system for simultaneous cultivation of soil biology and plants uses sub-irrigation wicking techniques, aeration tubes, and a compost substrate to optimize soil health, plant growth, and water efficiency. The system combines a pipe or network of subirrigation pipes with a water regulation assembly, aeration tubes, and compost substrate, supporting an aerated static pile composting process that enhances biodiverse soil microbiology. Grow bags positioned within the composting zone and adjacent in-ground planting zones enable concurrent plant and soil biology development, fostering a dynamic soil food web that supports native species, crop productivity, and restoration vegetation. This design promotes natural nutrient cycling, conserves water, and supports ecosystem resilience, making it adaptable for applications in sustainable agriculture, landscape restoration, and ecological rewilding.

15 Claims, 7 Drawing Sheets

(51) Int. Cl.
A01G 18/10 (2018.01)
A01G 25/06 (2006.01)
*A01G 9/04* (2006.01)

(56) References Cited

U.S. PATENT DOCUMENTS

| 9,629,313 | B1 * | 4/2017 | Grossman | ............ | G05D 7/0617 |
|---|---|---|---|---|---|
| 10,159,203 | B1 * | 12/2018 | Ogram | ................... | A01G 25/16 |
| 2009/0052990 | A1 * | 2/2009 | Richardson | ............ | A01G 25/06 |
| | | | | | 405/43 |
| 2013/0047499 | A1 * | 2/2013 | Christiaens | ............ | A01G 18/62 |
| | | | | | 47/1.1 |

FOREIGN PATENT DOCUMENTS

| CN | 115474492 | A | * | 12/2022 | ........... A01G 27/003 |
|---|---|---|---|---|---|
| KR | 20220142941 | A | * | 10/2022 | ........... A01G 27/003 |

OTHER PUBLICATIONS

Johnson, D. W., et al., Development of soil microbial communities for promoting sustainability in agriculture and a global carbon fix. PeerJ Preprints, 5, e2786v1, 2017.
Douds, D. D., et al., On-farm production and utilization of arbuscular mycorrhizal fungus inoculum, Canadian Journal of Plant Science, 85(1), 15-21, 2005.
Lowenfels, J., Teaming with Fungi: The Organic Grower's Guide to Mycorrhizae, Timber Press, 2017.
Altieri, M. A., The ecological role of biodiversity in agroecosystems, Agriculture, Ecosystems & Environment, 74(1-3), 19-31, 1999.
Hart, M. M., & Trevors, J. T., Microbe management: application of mycorrhizal fungi in sustainable agriculture. Frontiers in Ecology and the Environment, 3(10), 533-539, 2005.

* cited by examiner

INTEGRATED ECOSYSTEM FOR SIMULTANEOUS CULTIVATION OF SOIL BIOLOGY AND PLANTS

RELATED APPLICATION

This application claims benefit to U.S. Application No. 63/538,392 filed Sep. 14, 2023, which is incorporated by reference herein in its entirety.

BACKGROUND

The present disclosure relates generally to systems and methods for improved soil cultivation and plant growth.

There is an ongoing need for more efficient and lower cost agricultural and soil cultivation systems which promote plant and ecosystem health and optimize water management, propagating biodiverse beneficial soil microorganisms that improve plant productivity, nutritional uptake, plant's water uptake, and overall resilience. For example, sprinklers and drip irrigation provide effective plant watering, but result in water waste through evaporation. Hydroponics, on the other hand, can be water-efficient, but do not support complex soil ecosystems. Additionally, conventional farming practices often degrade soil health, rather than improve it, through the use of synthetic inputs but fail to contribute to soil regeneration. While modern precision agriculture uses complex technology to optimize water and nutrient delivery, these systems are costly and require technical expertise.

As such, an improved system which addresses at least the above-mentioned issues is needed.

SUMMARY

According to various embodiments, disclosed is a modular, integrated ecological system designed for the simultaneous cultivation of soil biology and plants, including crops, native species, and restoration vegetation. The disclosed system leverages a combination of sub-irrigated wicking, aeration tubes, planting and composting zones in a modular design to promote a biodiverse soil environment and provide a robust, affordable, and scalable solution for enhancing soil health while promoting complex biodiversity across various applications such as rewilding, landscape restoration, and sustainable agriculture. This modular design enables flexible configuration, allowing components to be arranged to meet specific ecological goals, from small container setups to large in-ground plantings. In some embodiments, the system builds upon established soil food web principles and static pile composting methods, presenting a novel approach to land management and ecological restoration. The system supports the growth and propagation of a diverse range of beneficial soil organisms, such as arbuscular mycorrhizal fungi (AMF), bacteria, protozoa, and nematodes, fostering nutrient cycling, plant resilience, and ecosystem stability through balanced moisture and aeration.

According to various embodiments, the integrated ecological system may comprise: a) a subirrigation system including one or more subirrigation pipes configured with access holes along the pipes, said access holes enabling passive transfer of water from the pipes via wicking capillary action; b) a wicking system integrated with the subirrigation pipes, the wicking system comprising wicking fabric, potting mixture, and/or grow bags containing the potting mixture, the wicking system being configured to draw water through the access holes to provide consistent moisture to surrounding compost and plant root zones; c) a float valve tank assembly supplied with water from a pressure line, catchment tank/low pressure gravity source, or similar source, connected to the subirrigation pipe(s) to maintain a consistent water level in both the tank and pipes, as regulated by the float valve; and d) aeration tubes embedded within the composting zone, positioned to maintain oxygen flow and promote an aerated static pile composting process, which, in combination with the wicking system, supports optimal microbial activity and soil health. In some embodiments, the system may optionally include one or more grow bags containing potting material, positioned to receive moisture from the wicking system via mesh cups or other wicking mechanism that extends into the pipes, to distribute water to the adjacent compost substrate, and support plant growth, while optionally supporting the co-cultivation of arbuscular mycorrhizal fungi (AMF) and other propagules in the grow bags. In certain embodiments, the composting zone comprises a compost substrate (also referred to as "developing compost") that encases the sub-irrigation pipes and aeration tubes, providing a nutrient source and fostering a biodiverse soil food web beneficial to soil and plant health as well as a pass-through means of watering adjacent planting zones and providing evaporative insulation to the plants and trees. In further embodiments, the system may include one or more support components for elevating and stabilizing the sub-irrigation pipes, float valve assembly, and aeration tubes within the composting zone. In further embodiments, the system may include additional wicking material placed to provide broader hydration to the planting and composting zones.

In certain embodiments, disclosed is a method for cultivating compost, which may comprise arranging an ecosystem including composting zones and plant root zones around a subirrigation system; and using a wicking system for irrigation of the composting zones and simultaneous plant cultivation. In some embodiments, the subirrigation system includes one or more subirrigation pipes configured to receive water from a water supply line, the one or more subirrigation pipes further including access holes enabling passive transfer of water in the subirrigation pipes via the wicking system. In further embodiments, a float valve tank assembly is coupled between the water supply line and a primary pipe in the subirrigation system, the float valve tank assembly configured to maintain a consistent water level in the one or more subirrigation pipes. In some further embodiments, the wicking system comprises wicking material in contact with the water in the subirrigation pipes and configured to draw water through the access holes to provide consistent moisture to compost in the composting zones and plant root zones. In further embodiments, aeration tubes comprising perforations are embedded within the composting zone and configured to maintain oxygen flow for aerating the composting zones.

As such, the disclosed subject matter introduces a system which overcomes the limitations of the prior art and affords the ability to utilize composting and wicking systems to irrigate trees and crops which may be located in growbags and/or in the ground directly below the compost and at the moisture fringe while insolating their roots from evaporation as well as inoculating their root zones with in-situ soil biology produced by the system. The integrated multi-function nature of this approach results in more efficient control and delivery of water, nutrients, and soil biology to trees and crops while also improving overall in-situ soil structure and health; and cultivating valuable propagules adapted to the local crops and conditions.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figures 1, 2:
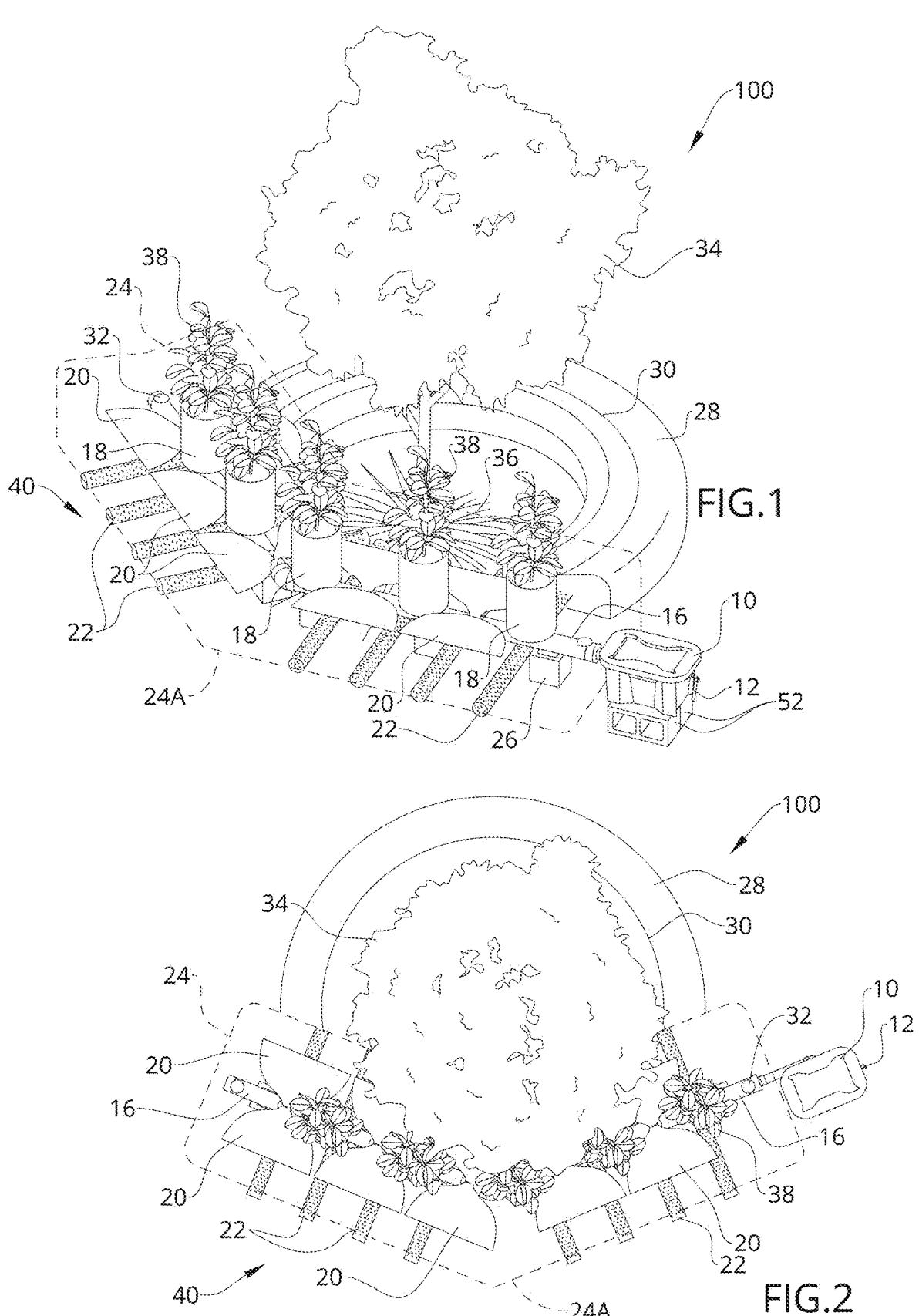
FIG. 1 is a perspective depiction of an ecological system, according to certain embodiments.
FIG. 2 is a top view of the ecological system of FIG. 1.

Advancements in soil science have highlighted the pivotal role of soil microorganisms in ecosystem resilience, plant health, and carbon bio-sequestration. Research has demonstrated the complex interactions between plants and soil microbes, and how these relationships impact nutrient cycling, plant productivity, and overall ecosystem function. Studies on soil food web dynamics have shown the importance of diverse microbial communities for maintaining soil health and supporting plant growth.

Innovations in propagule production and use have demonstrated the potential for enriching soil biology to achieve improved ecological outcomes. ((See Ingham, E. R. (2000), The Soil Food Web: Its Importance in Ecosystem Health. Soil Biology Primer. USDA Natural Resources Conservation Service; Johnson, D. W., et al. (2017). Development of soil microbial communities for promoting sustainability in agriculture and a global carbon fix. PeerJ Preprints, 5, e2786v1; and Lowenfels, J. (2016). Teaming with Fungi: The Organic Grower's Guide to Mycorrhizae. Timber Press.). However, current systems often segregate soil enhancement and plant cultivation processes, leading to inefficiencies and a lack of integrated biodiversity development in both the cultivars and soil ecology. Traditional irrigation and soil remediation techniques require complex infrastructure, resulting in limited scalability and accessibility, especially in ecological restoration and rewilding projects. The Rodale Institute's on-farm Arbuscular Mycorrhizal Fungi (AMF) methodology has shown that AMF propagules can be produced directly on farms, enhancing plant nutrient uptake and ecosystem health. (See Douds, D. D., et al. (2005). On-farm production and utilization of arbuscular mycorrhizal fungus inoculum. Canadian Journal of Plant Science, 85(1), 15-21) This methodology involves growing plants in confined conditions to promote faster sporulation of the obligatory symbiont AMF (which requires living roots to propagate), which can then be used to inoculate larger areas. However, traditional applications of this methodology use dedicated AMF cultivation systems for this propagation. Additionally, advanced static aerated pile composting systems such as the Johnson-Su bioreactor are typically isolated from the ecosystem or growing environment, so interaction with living roots and a biodiverse soil-food-web community is impeded. (See Ingham, 2000; Johnson et al., 2017; Lowenfels, J. (2016). Teaming with Fungi: The Organic Grower's Guide to Mycorrhizae. Timber Press.)

According to various embodiments as depicted in FIGS. 1-12, disclosed is an ecological system 100 which combines plant growth with soil cultivation for high and efficient soil enrichment, including cultivation of obligatory symbionts such as AMF, as well as robust plant growth. In certain embodiments, the disclosed system is configured to irrigate compost 24 to promote development of the compost, while simultaneously supporting plant growth. In certain embodiments, this is achieved via a sub-irrigation pipe network comprising an arrangement of subirrigation pipes 16, and a moisture wicking system for regulated and optimal moisture delivery to compost 24. In embodiments, compost 24 (also referred to as "developing compost 24") comprises bioreactive mulch and other mulch materials (e.g., wood chips, leaf litter, straw, etc.), which may include residue from a targeted cultivation species. In some embodiments, developing compost 24 is arranged around subirrigation pipe(s) 16, wherein pipes 16 may be embedded within developing compost 24 for minimized evaporative losses. In one embodiment, developing compost 24 may be formed into compact rectangular berms, but not necessarily so. In some further embodiments, aeration pipes 22, which include perforations through which air can flow, may be embedded within developing compost 24 and extend outside the boarder 24A (i.e., berm edge) of developing compost 24 to provide oxygen and maintain an aerobic environment in the compost. In certain embodiments as depicted in the figures, aeration pipes 22 may be arranged in perpendicular alignment to subirrigation pipes 16, but not necessarily so.

In some embodiments, subirrigation pipe(s) 16 include a row of top access holes 16A, end plugs 32, and are constructed from PVC or other suitable material. These pipes are laid out in configurations tailored to different planting needs, such as rewilding plots, restoration projects, agricultural setups, etc., and are supplied via a regulated water supply line 12 which by means of the float valve tank assembly maintains water in the pipes at a consistent water line level 17 below access holes 16A. Access holes 16A define individual stations through which water conveyed via the wicking system is accessed. Water supply line 12 provides either water main pressure or low pressure (for example, from a catchment tank) water flow into subirrigation pipes 16, and is regulated by a float valve to ensure a steady moisture supply to developing compost 24. In one embodiment, a system for maintaining the water level may comprise a float valve tank 10 and a float valve 14 configured to shut the water supply line 12 when the water line level 17 rises above a set level and to open line 12 when the water level falls below the set level. This provides a reliable water source for both plant and soil microbiome development without the need for constant monitoring and/or adjustment.

In one embodiment, subirrigation pipes 16 may be supported atop one or more pipe support blocks 26 and/or support brackets 46 that elevate and maintain the pipes in a stable horizontal orientation, Additionally, float valve tank 10 may be elevated via one or more tank support blocks 52 to maintain appropriate level with pipes 16. It shall be appreciated that any number of blocks 26, 52 may be used depending on the desired height of the compost berm pile. It shall be appreciated that blocks 26, 52, and support brackets 46 may have different arrangements in alternate embodiments, and that different support components may also be used in alternate embodiments. In other embodiments, developing compost 24 may be provided within in-ground trench(es) and may support subirrigation pipes 16. In one embodiment, the entire arrangement may be located so that the pipe supports and compost resides within a trench. This arrangement has the benefit of more coupling between the earth and compost, which can be beneficial to soil biology in various ways including some degree of frost protection in cold winters.

Wicking System

The wicking system is configured to draw water directly from subirrigation pipes 16 through access holes 16A and deliver the water passively (i.e., through capillary action and/or gravity) to developing compost 24, wherein the continuous and regulated supply of water into subirrigation pipes 16 ensures gradual, consistent balanced delivery to the compost. In further embodiments, the wicking system and/or developing compost may also provide coverage over wicking material, above the access holes, 16A to prevent water evaporation.

Figures 3, 4, 5:
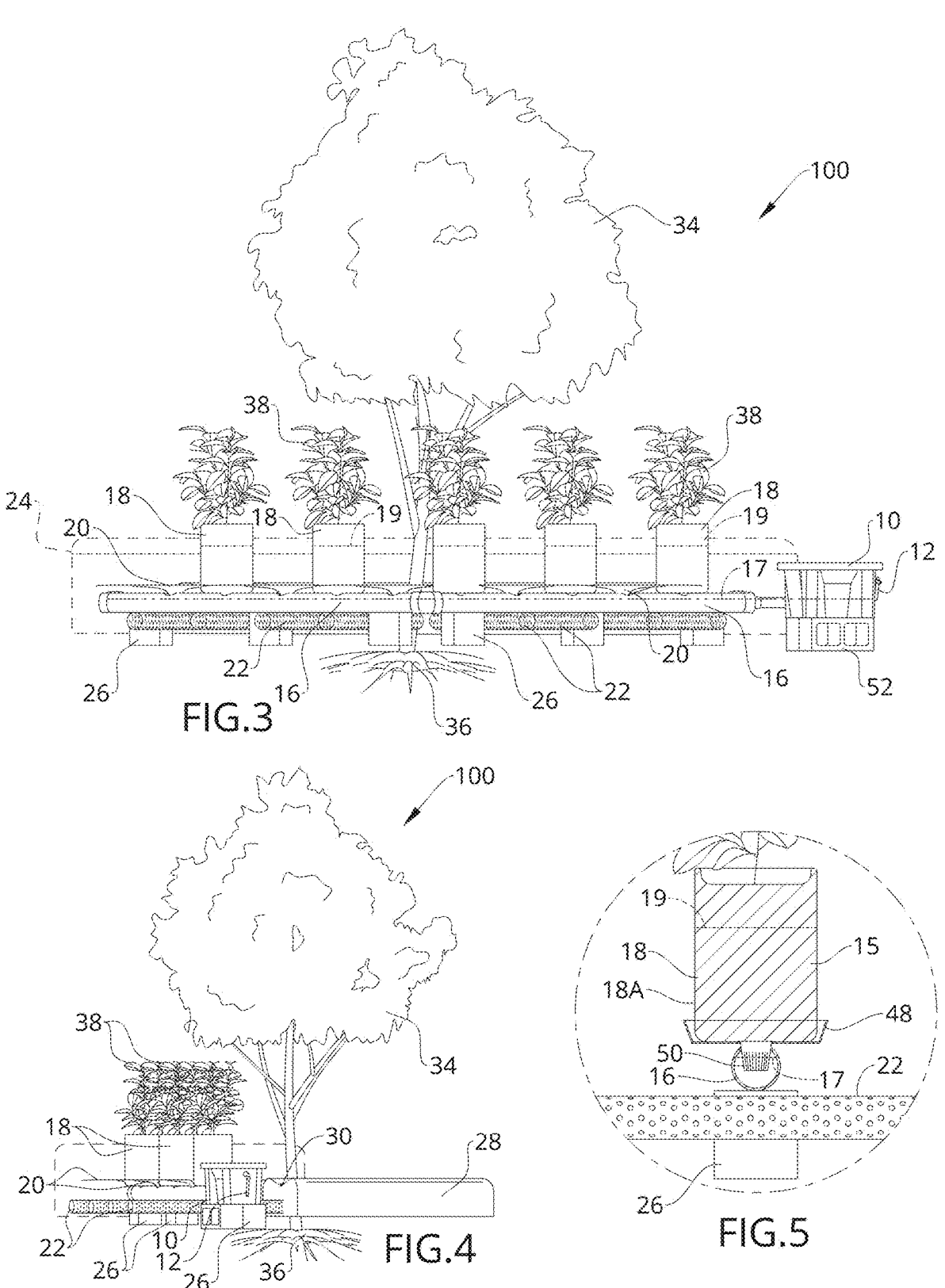
FIG. 3 is a front view thereof.
FIG. 4 is a side view thereof.
FIG. 5 is a detailed view of a grow bag and interface with a subirrigation pipe (water supply line) which may be used in the ecological system.
Figure 6:
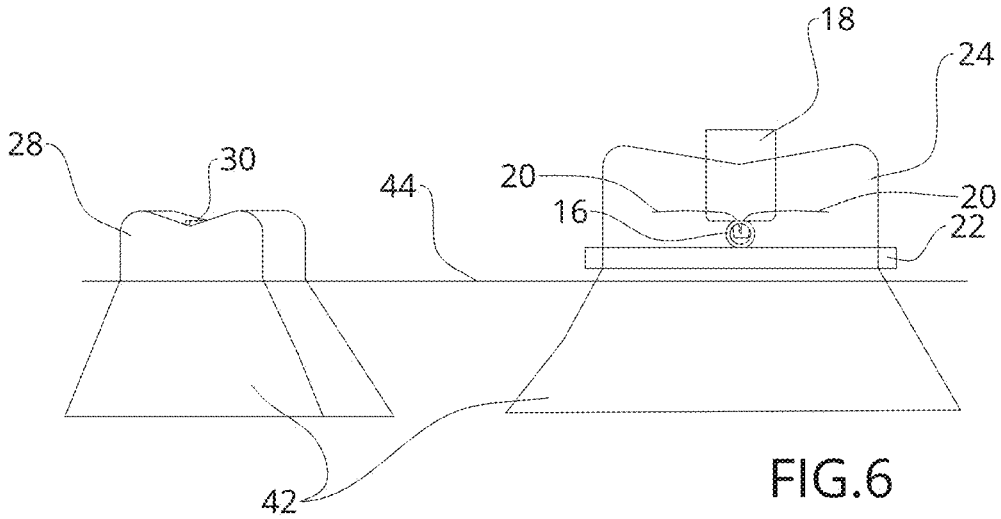
FIG. 6 is a schematic view depicting sub-surface moisture fringe in the system.
Figure 7:
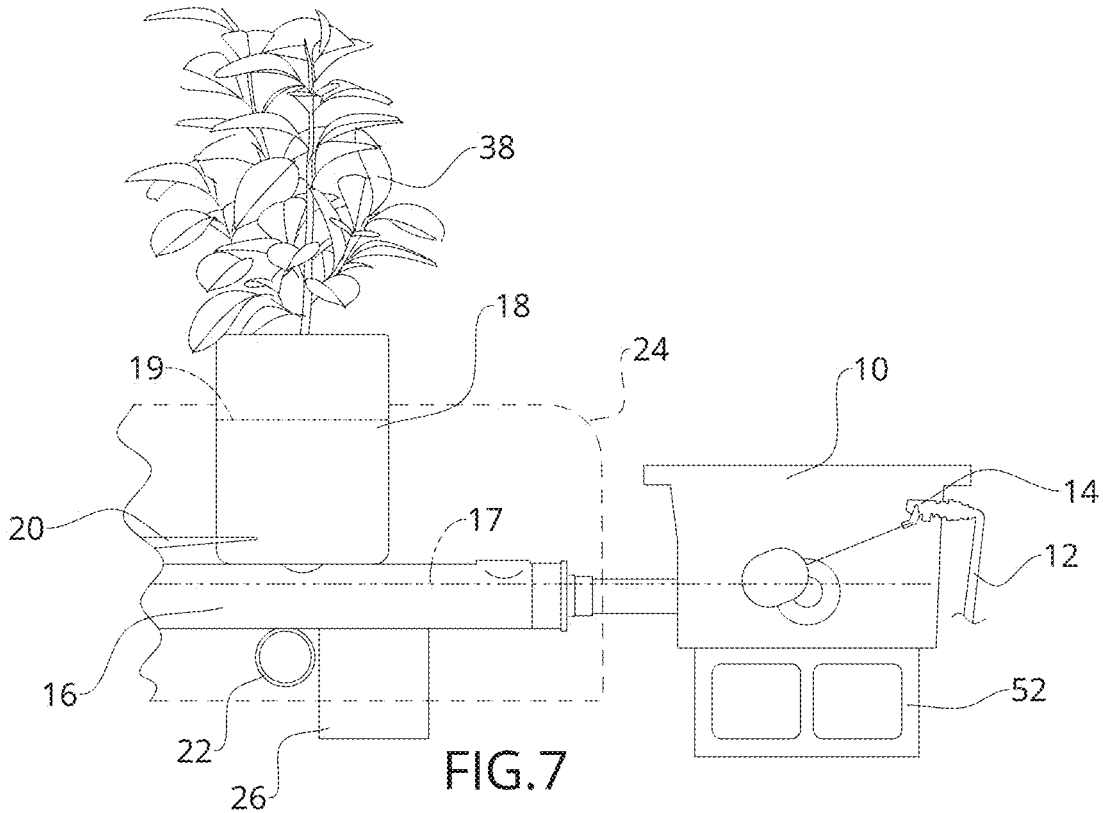
FIG. 7 is a schematic view of a float valve tank assembly and its interface with the subirrigation pipe of the system.

In certain embodiments, the wicking system may comprise potting material 15 which may be contained within growbags 18, supplied by mesh cups or other wicking mechanism extending into the subirrigation pipes, hydrating plants/shrubs 38, and/or optionally supported with perforated trays or other means such as wire support frames. In one embodiment as best depicted in FIG. 5, each growbag 18 may be supported atop a perforated tray 48. The perforated tray 48 may be fastened to (e.g., using screws) and sit atop pipe 16 and surrounding compost, and may include a central aperture through which meshed cup 50 extends into pipe 16 and below water line level 17 through the pipe access hole 16A. The potting material 15 within cup 50 and tray draws water out of pipe 16 to irrigate the potting material in the growbag and also drips through the holes in tray 48 (and growbag 18) onto developing compost 24. Landscaping fabric or other permeable material may be used to retain the potting mix in the perforated trays and cups. In certain embodiments, a substantially constant water level 19 may be maintained in the growbag potting material as water is drawn from the sub-irrigation pipe upwards into the bag due to the wicking behavior of potting mixes. This is desirable as soil biology, particularly fungal organisms, generally benefits from consistent moisture content. However, in cases where periodic dry conditions are desired, the water supply line to the float valve assembly may simply be shut off by manual or automated means according to the desired irrigation schedule. It shall be appreciated that moisture level will vary based upon wicking capacity of the potting mix, compost substrate, weather conditions, and the relative height of the compost substrate and the growbags. Likewise, in the developing compost 24 there may be some upward wicking of moisture that may penetrate through the permeable fabric of the growbags. In some embodiments, compost substrate height may be kept near the top of the growbags to maximize the compost volume, evaporative insulation of the growbags, and the interaction between the roots and biology in the growbags and the developing compost external to the growbags. However, in other embodiments, the height of the compost substrate can optionally be kept about a few inches above the wicking material, that is, about less than half the height of the growbags. This option provides evaporate insulation of the wicking material and a hydrated compost substrate, while allowing the sides of the growbags to dry out and thereby effectuate the beneficial function of air-pruning roots if so desired. In addition, isolation of the growbags from the compost substrate can accelerate the production of fungal propagules. (See Lowenfels, J. (2017). Teaming with Fungi: The Organic Grower's Guide to Mycorrhizae. Timber Press, which provides that sporulation is usually triggered by crowding in the pot as mycorrhizae develop, and that as soon as the pot becomes full of fungi, they begin the reproduction process.)

In some alternate embodiments, tray 48 and cup 50 which are filled with potting material may be used with growbags 18 omitted. In some other embodiments, growbags 18 may be used with other wicking mechanism (e.g., fabric) configured to deliver water to the grow bag. For example, a fabric and/or cup may be integrated into the horizontal/flat bottom of grow bag and is inserted directly into pipe 16 through access holes 16A, wherein potting material 15 in the growbag container 18A is in contact with the water in subirrigation pipe 16.

In some further embodiments, the wicking system may utilize a wicking fabric 20 such as cloth or rope. According to various embodiments, wicking fabric 20 may be used by itself, or in combination with growbag 18, tray 48, and/or cup 50. In one embodiment, wicking fabric is angled horizontally or upwards from access holes 16A (i.e., at an angle greater than or equal to 0 degrees). In another embodiment, wicking fabric 20 may slope below the water level in the subirrigation pipe to achieve a higher flow rate in the wicking fabric via a gravity siphon effect. It is noted however, that for most applications such higher flowrate is not necessary for proper hydration of compost and plants in the ground. In one embodiment, wicking fabric 20 has a winged profile with a narrow end that dips into subirrigation pipe 16, and an expanded winged portion that spreads over developing compost for hydrating the compost and moisture fringe area 42 below grade. As such, wicking fabric 20 wicks water out of pipe 16 to hydrate the compost substrate below the wicking fabric.

In further embodiments, some access holes 16A in pipe 16 may include growbags 18, trays 48, and/or cups 50, according to any of the embodiments described above; and other access holes 16A may be provided with wicking fabric 20. This may be arranged, for example, in an alternating pattern (see FIG. 1). In another embodiment, wicking fabric 20 may extend directly out from growbag 18 (see for example FIG. 6) to wick water from the subirrigation pipe to augment water supplied to the compost via the growbag 18 to developing soil 24. In this embodiment, wicking fabric 20 may itself dip into the water in subirrigation pipe 16. Additionally, growbag 18 with wicking fabric 20 may be used with or without tray 48 and/or cup 50, according to any of the above described embodiments. In another embodiment, wicking fabric 20 may be supported via tray 48 and/or cup 50. Although the wicking fabric 20 (with or without a tray) does not require a cup, the cup may keep the fabric secure in the pipe hole and keep debris from getting into the pipe. and omits growbag 18. It shall be appreciated that wicking fabric 20 may comprise any suitable material for effectuating capillary draw of water into developing compost 24. Additionally, as water flowrate is proportional to the size of wicking material and is affected by the orientation of the wicking material with reference to the waterline in the sub-irrigation pipe, wicking fabric 20 may be of different shapes, orientations, and dimensions in alternate embodiments.

As such, growbags 18 enable simultaneous irrigation of developing compost 24 while also supporting plant growth using the subirrigation pipe system. The wicking fabric 20 spreads out over developing compost 24 to allow for a wider area of irrigation and effective hydration. The trays 48 help to stabilize and/or affix the position of growbags 18 and wicking fabric 20. Other support devices such as wire frames can also serve this function to uniformly support growbags and wicking material in alternate embodiments. In certain embodiments, compost may be added periodically below and around the pipe and growbags and surrounding compost substrate to fill voids and maintain support of the growbags and/or wicking material due to berm shrinkage as compost development advances.

In certain embodiments, ecological system 100 may comprise plants such as trees 34, shrubs 38, row crops 54, and/or various other plantings 40. In embodiments, the different plants selected for a given ecological system 100 preferably form a guild relationship that exploits the same class of environmental resources in a similar way. The presence of these plants, including the living roots 36 of the plants/trees within ground soil 44 (and growbags 18 where used) in the vicinity of developing compost 24 promotes growth of symbionts such as fungi and bacteria in the compost which is beneficial for the specific plants being grown and produces valuable propagules that can be utilized for sale and/or to inoculate plants, trees, and soil broadly through liquid extractions, spores, direct composting, spray applications, soil injections, seed coatings and other known methods. In certain embodiments, plants are located directly in contact with developing compost 24 to effectuate interaction between living roots and spores, and microorganisms in the compost for a unique fungal growth/soil biology supported by the living roots. However, any effective distance for creating a dense living roots environment that interacts with biology in the compost may suffice in alternate embodiments.

Figure 8:
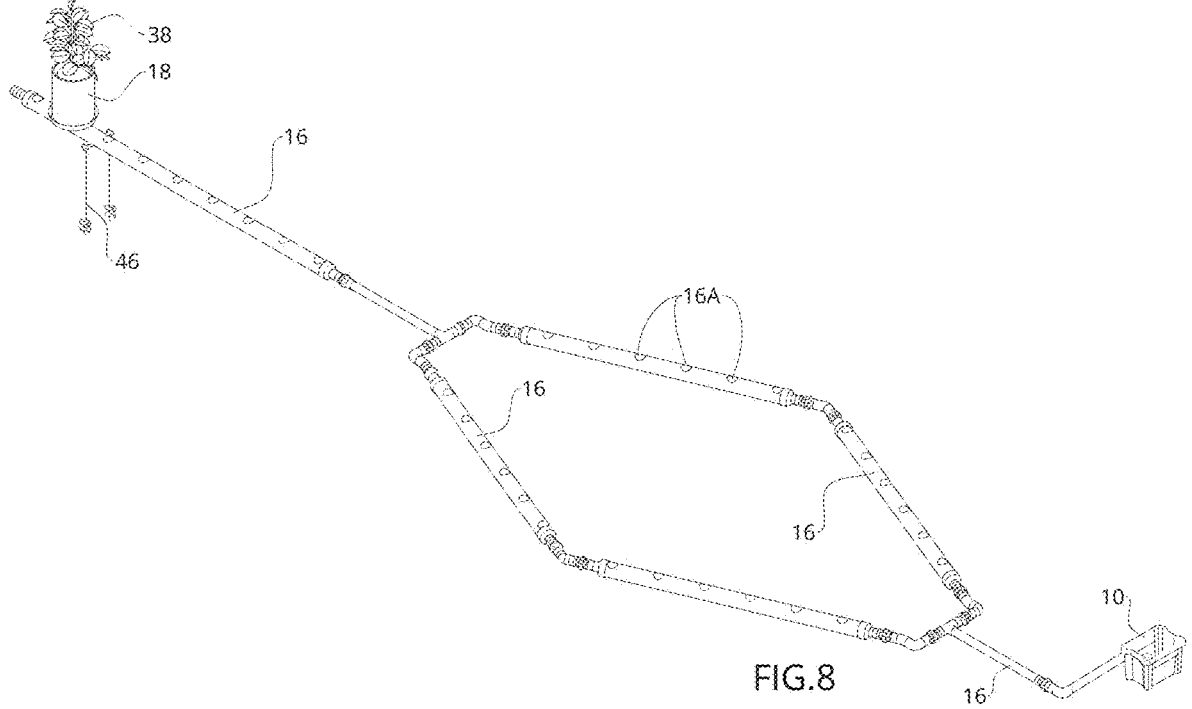
FIG. 8 is a schematic view of a subirrigation pipe setup having a "kite" configuration for guild or companion planting according to certain embodiments.
Figure 9:
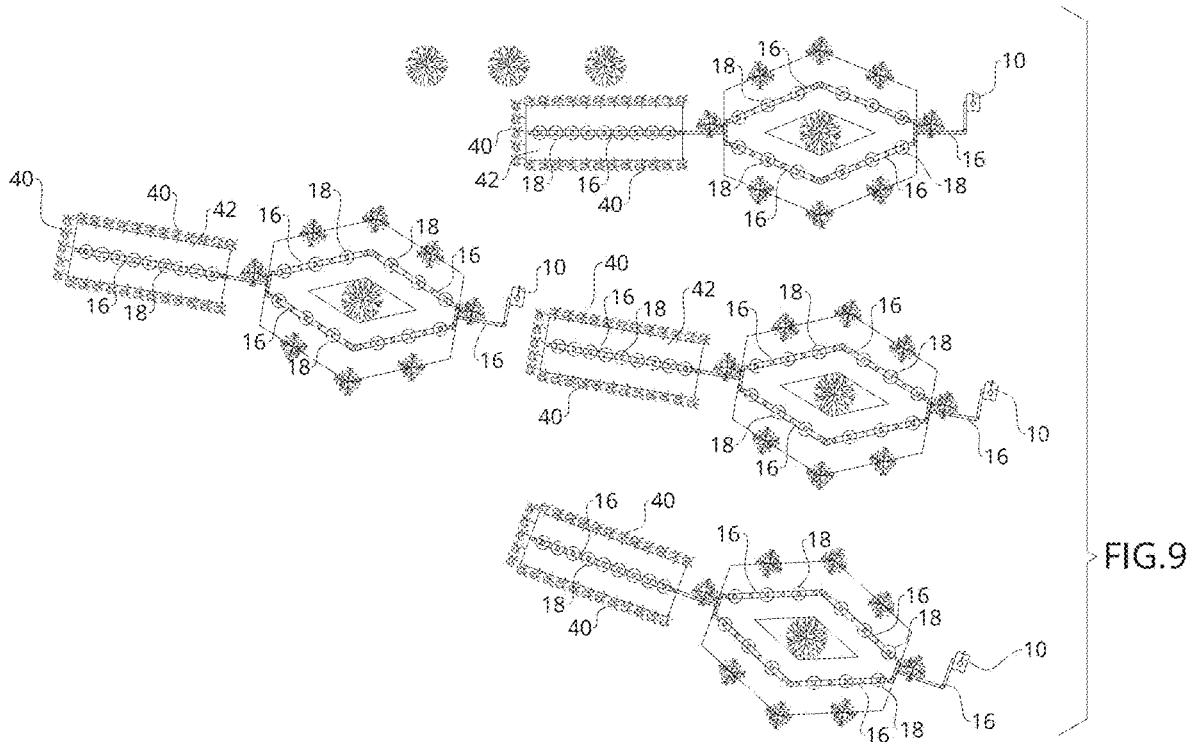
FIG. 9 is a schematic view of an array of guild or companion planting systems utilizing the subirrigation pipe setup of FIG. 8.
Figure 10:
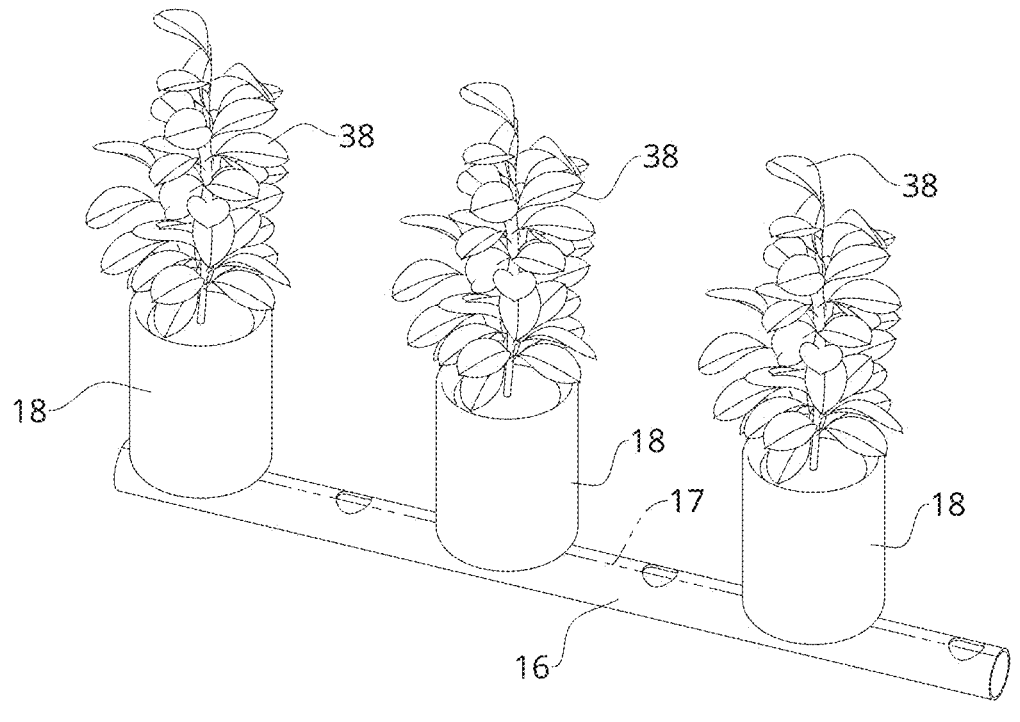
FIG. 10 shows a grow bag set up of the system, according to certain embodiments.
Figure 11:
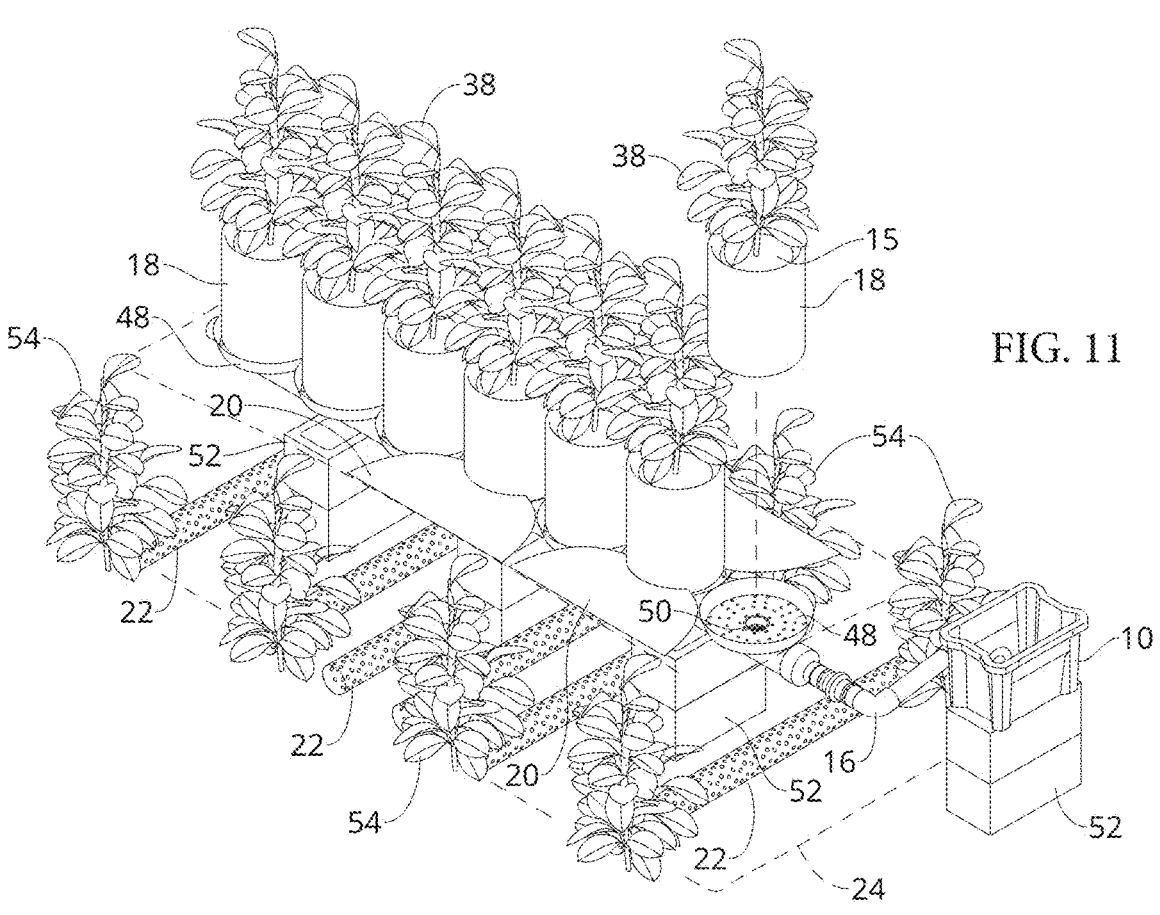
FIG. 11 is a perspective view of a row setup of the ecological system, according to an alternate embodiment.
Figure 12:
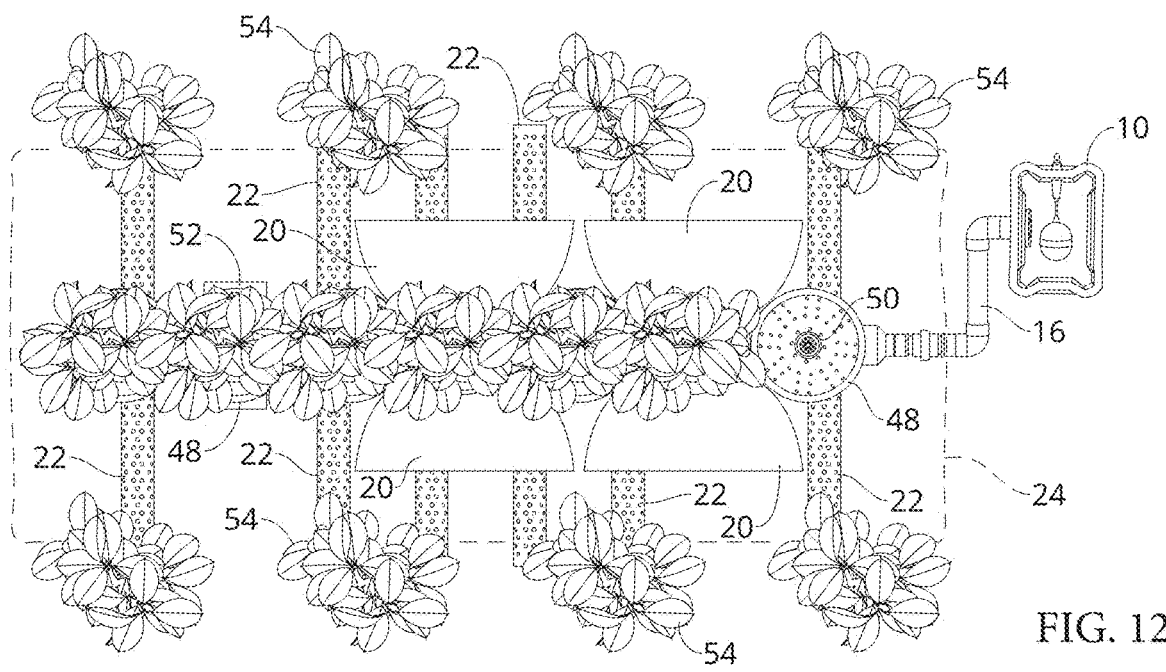
FIG. 12 is a top view of the ecological system of FIG. 11, with one grow bag removed.

It shall be appreciated that ecological system 100 may include different types of plants in various arrangements in alternate embodiments. In certain embodiments, rows of subirrigation pipes 16/developing compost areas (i.e., berm rows) may optionally include central growbags rows, and optional crops 40 provided at the berm edge. In certain embodiments, such berm rows may be arranged around one or more trees 34. In one embodiment, berm rows may be arranged in a "kite" configuration as depicted in FIGS. 8 and 9, whereby a single tree (or multiple trees are) is surrounded by 4 berm rows in diamond configuration as depicted to support guild planting and the plant and soil biodiversity that entails. Additionally, an orchard garden may include a multiple number of guilds arranged in this "kite" berm row formation as best depicted in FIG. 9. It shall be appreciated however, that any geometric arrangement, including a non-closed arrangement may be used in alternate embodiments. Furthermore, ecological system may optionally include any other gardening/ecological components or systems as is known in the art, including but not limited to drip irrigation piping 30, conventional mulching 28, etc. In some embodiments, developing compost biology 24 may migrate into the various plants of ecological system 100 for optimal growth. In some embodiments, growbags 18 and/or surrounding plants in ecological system 100 may be fed with developing compost and propagules produces developing compost 24 to boost growth. Developing compost 24 may further be harvested for use in other agricultural environments, i.e., gardens, fields, potted plants, etc. The integrated symbiotic composting functionality of the system produces valuable propagules that can be utilized for sale and/or to inoculate plants, trees, and soil broadly through liquid extractions, spores, direct compost application, and other means.

The disclosed ecological system thus incorporates a water regulation system combined with a wicking system for consistent and reliable moisture delivery simultaneously to both cultivation and composting zones with minimized evaporation losses common to conventional sprinkler systems and the root-bypass loss common to timed drip irrigation systems. The passive water delivery ensures gradual, consistent moisture levels directly at the root zone that support optimal conditions for microbial and plant growth, enhancing soil food web complexity. This results in developed compost that is a rich soil microbiome, essential for complex biodiversity and ecosystem resilience and health, and further supports plant cultivation areas that may include a variety of plant species, from food crops to native flora and rewilding species. The integration of the composting zones with plant cultivation provide an environment conducive to the development of diverse soil microorganisms, including bacteria, fungi, and other beneficial organisms that form the soil food web, whereby the mulch berm acts as a bioreactor, facilitating composting and the establishment of a biodiverse ecosystem. This approach allows for continuous symbiotic interactions between soil biology and plant roots, all adapted to local conditions, which is crucial for rewilding and restoration efforts. Additionally, the use of subirrigation pipes eliminates surface evaporation and prevents water bypass issues commonly seen in drip and surface irrigation, optimizing water usage for both plants and soil biology.

In certain embodiments, the plant cultivation areas may include grow bags, planting beds, and/or other containers designed to support various plant species. These areas may be positioned to benefit directly from the moisture provided by the wicking system, and the nutrients and microbial life generated in the composting zones. The grow bags may be particularly beneficial in cultivating Arbuscular Mycorrhizal Fungi (AMF), following the principles of the Rodale Institute's on-farm AMF methodology. In the confined environment of the grow bags, AMF can sporulate faster, creating propagules that can be used to inoculate the bulk land. This localized production of AMF inoculum is highly beneficial, as it is acclimated to the specific soil, climate, and plant species of the area.

Setting Up the Ecological System

According to various embodiments, ecological system 100 may be implemented by selecting the mulch substate, trees, bushes, and/or other plants for forming the system, then laying out the subirrigation pipes 16 according to a geometry and size that accommodates the selected species. Thereafter, the float valve assembly (i.e., tank 10 and float valve 14) may be installed and connected to water supply line 12, and the selected plants (i.e., plant guild), mulch material, and wicking system arranged around the subirrigation pipes.

Preferably, the selected plants and any added soil propagules, nutrients etc. have guild symbiosis with one another for efficient and optimized nutrient cycling and uptake, water retention, biodiversity, and resilience to environmental stresses. This fosters ecological resilience with a regenerative impact on the environment to achieve high crop productivity, efficient water usage, and/or ecological resto-
ration. Over time, seeds from these high-performing plants
in the symbiotic communities created may be selected for
planting to improve the system's efficiency and biodiversity
in future cycles. In certain embodiments, guilds may include
nitrogen fixers, dynamic accumulators, pollinator plants, and
other supportive species. Guilds are composed of symbiotic
plant species configured to promote nutrient cycling and
resilience, organized around a central tree(s) or in linear
rows. This configuration enhances ecosystem resilience by
leveraging complementary functions among species, such as
nitrogen fixation, pollination, and dynamic accumulation.

In some embodiments, the guild and pipe layout design
can be arranged around a central tree (or trees) with comple-
mentary plants (e.g., bushes and crops) that provide diverse
functions. In some other embodiments, linear arrangements
can be configured depending on land layout and goals. As
depicted in FIGS. 8 and 9, the central tree and linear
arrangement may be combined. The pipe components which
form the pipe layout design are connected, whereby an end
pipe is plugged and the float valve assembly and water
supply line are installed to a primary pipe through which
water is delivered throughout the entire pipe system. In
certain embodiments, the water supply may comprise a
conventional agricultural irrigation supply line (e.g., about
50 psi or less, however higher pressure may also be used) or
a water catchment system configured with approximately 2
feet of water head or more (depending upon float valve
operational specifications). In one example, a water tank
may be placed on a stand elevating the bottom of the tank
approximately 2 feet above the waterline in the sub-irriga-
tion pipe and float valve tank.

In certain embodiments, preparation and setup of the
subirrigation pipe system prior to installation of the pipes
may comprise assessing the soil type, moisture levels, and
existing soil biology and vegetation, and clearing and lev-
eling the necessary space for the system. In this stage,
adjustments may be implemented based on soil improve-
ment and ecosystem restoration goals. Such adjustments
may comprise, for example, adding amendments, mulching,
or altering the surface for rainwater absorption based on
specific ecosystem objectives.

In certain embodiments, the plant guild is surrounded
with mulch berms composed of organic materials such as
wood chips, leaf litter, straw, or other agricultural residues
that form the developing compost zones. Starting materials
for the compost should be selected based on the desired
biological outcomes, including bacteria, fungi, protozoa,
and nematodes to provide nutrient-rich mulch berm compost
zones for the soil food web. The organic material decom-
poses over time, supporting beneficial organisms. Compost
zones should be maintained to foster soil food web devel-
opment and nutrient cycling.

In some embodiments, once the compost zones are in
place, the wicking system may be set up for maintaining
optimal moisture content in the mulch berm. In certain
embodiments, wicking material may be placed or laid out at
the stations (access holes 16A) along subirrigation pipes 16
as needed to maintain the optimal moisture content in the
mulch berm that supports fungi and the full soil food web,
and ideally to irrigate plants and trees with roots placed
directly below and at the edges of the mulch berm via the
moisture plume under and adjacent to the mulch berm. In
some embodiments, grow bags 18 may be utilized where
benefits of containerized growing is desired. The grow bags
18 may be used in conjunction with or as an alternative to
the wicking material to provide for consistent moisture and nutrient cycling through the subirrigation pipe system func-
tion. In some embodiments, grow bags 18 may further be
used for planting and/or cultivating arbuscular mycorrhizal
fungi (AMF) to accelerate sporulation and create propagules
(AMF propagation). The environment in the growbags pro-
motes both AMF growth and the symbiotic plants that
support them, facilitating the development of a robust soil
microbiome. The propagules produced in these bags can be
harvested and used to inoculate bulk land, inoculate the land
on site and/or expand the system. The confined environment
in the grow bags is particularly conducive for rapid AMF
production. This step is optional but efficient for propagating
localized mycorrhizal fungi. Alternatively, plants can be
cultivated in the grow bags without a focus on AMF pro-
duction.

In some embodiments, a starter culture of beneficial soil
microorganisms may optionally be introduced into the
mulch berms and grow bags for initial inoculation of soil
biology. This can be achieved using biology grown in
previous implementation of the ecological system, compost
teas, soil extracts, commercially available propagules, and/
or inoculants developed using various known methods (e.g.,
methods from Dr. Ingham, Dr. Johnson, Lowenfels, J, and
others). While it is not necessary to propagate the indigenous
soil biology in the area, this step can be tailored to accelerate
soil food web development or address specific ecological
goals. In further embodiments, the AMF propagules and
microbial extracts produced in the mulch berms and/or grow
bags may be used to inoculate larger areas of land. This can
be achieved through spray applications, soil injections, seed
coatings, or other means. The inoculation process expands
the soil food web across broader landscapes, enhancing the
resilience and health of the ecosystem.

Crops may be harvested at the end of the growing season.
Additionally, AMF propagules or other soil biology culti-
vated in the grow bags and mulch berms can be harvested
throughout and after the growing season (i.e., as spores).
These propagules can be used for future inoculation efforts
or marketed as soil amendments. In some embodiments,
after harvesting, the used potting mix may be returned from
the grow bags to a "mother pile" for reconditioning, wherein
the mix may be amended as needed to restore its biological
activity, structure, wicking capacity (by adding coir for
example), and nutrient content, preparing it for the next
planting cycle. Additionally, agricultural residues such as
crop waste and pruning materials, may be returned to the
mulch berm. This reintegrates organic material and biology
back into the soil food web, promoting desired propagule
production decomposition and improving soil health for
future cycles. Additionally, the range of plants and soil
biology may be expanded as cultivation of the ecological
system continues. Plants, AMF, and other beneficial organ-
isms may be propagated for on-farm/site use, whereby any
excess propagules and microbial extracts may be marketed
as living soil amendments tailored to specific regional needs
or ecosystem goals.

As such, the disclosed system uses the same space, water,
and infrastructure to integrate soil enhancement and plant
cultivation, promoting the direct and immediate benefits of
a healthy soil food web to plant growth, with the space and
resource efficiency of a multifunctional system. By fostering
a symbiotic relationship between composting zones and
plant cultivation areas, it enables the development of com-
plex biodiversity essential for rewilding and ecosystem
restoration. Furthermore, the sub-irrigated wicking mecha-
nism provides water directly to the root zones, significantly
reducing evaporation loss compared to surface irrigation methods. Unlike timed drip irrigation which can result in bypass and uneven moisture distribution, ecological system 100 ensures consistent hydration, maximizing water use efficiency. The system's modular design allows for application across various scales, from small garden plots to large rewilding projects. The system can be adapted to different climates, soil types, and plant species, making it versatile for a wide range of ecological and agricultural applications. Moreover, facilitating the cultivation of AMF and other beneficial microorganisms within the system eliminates the need for off-site sourcing of soil biology. This local production ensures that the soil microbiome is acclimated to the specific environmental conditions and plant species, enhancing the success of rewilding and restoration efforts. Furthermore, utilizing passive water distribution and natural composting processes, the system requires minimal maintenance. It is constructed with easily accessible materials, making it affordable and simple to implement, even in regions with limited resources. Its low-tech design ensures resilience in various conditions, including adverse weather and infrastructure challenges. By continuously building soil health and fostering a diverse soil food web, the system enhances nutrient cycling, plant resilience, and ecosystem productivity. It supports the establishment of complex ecosystems in rewilding and restoration projects, contributing to overall biodiversity and ecological stability.

In certain embodiments, principles of the disclosed system may be applied to and support the functionality of the Rodale system, including the maintenance of optimal moisture content which is provided by the sub-irrigated irrigation system. A further advantage for AMF production is the coupling of the AMF cultivating system with composting and the surrounding agricultural environment, including trees and row crops for a more direct and biodiverse enhancement of the soil ecology.

Applications Beyond Crop Production

It shall be appreciated that the disclosed system may have application beyond crop production in alternate embodiments. Some non-limiting examples are as follows:

Rewilding and Restoration Projects: As the system supports the establishment of complex, biodiverse ecosystems by creating optimal conditions for soil food web development and plant growth, it can be used to restore degraded landscapes, reintroduce native plant species, and promote habitat diversity. Its ability to cultivate soil microbiomes in situ allows for the rapid development of resilient ecosystems that support a range of flora and fauna. Moreover, tree survival rates are known to improve dramatically when planted with beneficial soil biology. (See Ingham, 2000; Altieri, M. A. (1999). The ecological role of biodiversity in agroecosystems. Agriculture, Ecosystems & Environment, 74(1-3), 19-31 *Teaming with Fungi: The Organic Grower's Guide to Mycorrhizae*. Timber Press.)

Local AMF Propagation: Techniques such as the Rodale Institute's on-farm AMF methodology may be applied for rapid propagation of AMF within the grow bags. The consistent hydration and confined environment of the grow bags encourages AMF sporulation, generating a local source of propagules that can be used to inoculate the surrounding land. This process enhances plant nutrient uptake, supports ecosystem health, and eliminates the need to source AMF propagules from off-site locations.

Methods for Soil Biology Harvesting and Inoculation: Ecological system 100 provides a "cultivating bioreactor" that is compatible with the methods developed by Dr. David Johnson for harvesting soil biology and making extracts for spray application, injection, and seed coating. While the trees, bushes, and crops in and surrounding the Cultivating Bioreactor benefit from the symbiotic soil food web, the bulk land and plants in the region can be inoculated using these techniques. This allows for widespread enhancement of soil health and plant productivity across larger areas. Additionally, the system supports the methods advised by Dr. Elaine Ingham, which involve collecting soil biology from established forests and land areas. Unlike traditional methods that require off-site collection and purchase of propagules, this system enables the cultivation and harvesting of beneficial soil biology locally, ensuring it is acclimated to the specific conditions, soil, and plant species of the area without the need to disturb or deplete established soil biology from other land.

Urban and Peri-Urban Green Spaces: In urban environments, the system can be used to create green spaces that enhance biodiversity and mitigate urban heat islands. It provides a sustainable method for establishing gardens, parks, and green roofs with minimal water use and maintenance, contributing to the ecological health of urban areas. For pocket forest applications such as the Miyawaki Method it can displace the need for excavation for deep soil remediation methods that require heavy equipment by developing symbiotic soil biology with roots that drive fertility downward from the top.

Carbon Sequestration Initiatives: By fostering a biodiverse soil food web and supporting plant growth, the system enhances carbon bio-sequestration in soil. It offers a practical tool for projects aimed at reducing atmospheric carbon levels and mitigating climate change impacts through natural processes.

Nurseries: Trees and plants for restoration and landscaping can be cultivated and sold in grow bags containing soil enriched with beneficial, symbiotic biology. Cultivation in sub-irrigated grow bags provides excellent conditions for root air pruning, which prevents root binding and promotes healthier root systems. The system's design supports thriving soil biology, and the grow bags serve as convenient planting vessels, requiring no labor-intensive extraction from nursery setups. When ready for sale or planting, the bags are simply lifted from the tray or pipe, with new grow bags placed in their position. Compared to conventional bucket or impervious container methods, which can cause root binding and lack soil biology, this approach significantly improves tree and plant survivability. By including species-specific soil biology, plants are better prepared to adapt to their new environment, and beneficial organisms in the root zone can propagate across the bulk land where they are planted, enhancing ecosystem resilience and plant health. Nursery operators may also selectively breed trees and plants that exhibit strong symbiotic behaviors with co-planted soil biology, further enhancing product quality and ensuring that plantings are well-suited for resilient, long-term ecosystem health. Planting trees and plants with their symbiotic soil biology relationships strengthens both plant survivability and the soil biology's ability to establish and propagate, even in damaged or degraded land, where fostering robust soil ecosystems is often challenging. (See Altieri, 1999; Hart, M. M., & Trevors, J. T. (2005). Microbe management: application of mycorrhizal fungi in sustainable agriculture. Frontiers in Ecology and the Environment, 3(10), 533-539; Lowenfels, 2017).

Thus, the disclosed subject matter provides an integrated system that combines wicking irrigation with controlled composting environments to cultivate beneficial soil microorganisms and support plant growth simultaneously. It is designed to be adaptable and scalable, making it suitable for diverse applications, including crop production, landscape rewilding, and ecosystem restoration. By establishing a complex, biodiverse soil food web in conjunction with plant cultivation, the system enhances soil health, promotes sustainable practices, and supports ecological resilience. Furthermore, the low-tech approach and use of readily available materials make it accessible and easy to construct, repair, and maintain. The system's ability to function without pressurized water or electrical components makes it capable of unattended utilization of simple water catchment systems and robust in various conditions, including areas with limited infrastructure or during natural disasters. This robustness ensures continued operation and the establishment of biodiverse ecosystems, contributing to food production and ecological restoration even in challenging environments with labor and infrastructure limitations.

By combining the benefits of controlled water delivery with the cultivation of a rich soil food web, ecological system 100 promotes ecological balance and biodiversity. This provides significant improvement over conventional systems while retaining their benefits. For example, conventional systems like sprinklers and drip irrigation focus on plant watering without integrating soil biology. These systems often result in water waste through evaporation, root bypass, and lack the ongoing interaction between soil microbiomes and plant roots. In contrast, the wicking mechanism of ecological system 100 provides consistent moisture and supports soil biodiversity. Furthermore, in contrast to traditional composting methods that involve separate compost areas, the disclosed system exploits the continuous symbiotic interaction between soil biology and growing plants for simultaneous cultivation of a biodiverse soil microbiome and plant growth. Moreover, while hydroponics can be water-efficient, they fall short in supporting complex soil ecosystems, whereas ecological system 100 combines the benefits of controlled water delivery with the cultivation of a rich soil food web to promote ecological balance and biodiversity. Ecological system 100 is also far superior to traditional in-ground farming practices that often degrade soil health through the use of synthetic inputs, as it offers a sustainable alternative that enhances soil health and promotes complex biodiversity. This leads to more resilient and productive ecosystems, that may be chemical/pesticide free for organic produce. Additionally, in contrast to Advanced Precision Agriculture Systems that use complex technology to optimize water and nutrient delivery, the disclosed system provides a simpler, low cost, and robust solution that achieves similar benefits through natural processes and passive systems. By utilizing basic physical principles like capillary action for water distribution and fostering natural microbial processes for soil improvement, the system minimizes complexity and potential mechanical failure points while maximizing natural complexity and biodiversity that is essential to resilience and adaptivity.

Other wicking and sub-irrigation systems, such as wicking beds, capillary matting, sub-irrigated planters (SIPs), and grow bag setups, effectively deliver water to plants, but generally lack any integration with advanced composting processes, dual functionality for contained and in-ground plantings, and application in large-scale soil ecosystems. In contrast, the disclosed system incorporates dedicated composting zones that support both in-ground and containerized plants, enabling nutrient cycling across extensive soil areas and various micro-environments. This modular, integrated design offers flexible configurations for various applications—from container crops to expansive in-ground plantings—making it ideally suited to improve soil structure and enhance ecosystem resilience. Therefore, the disclosed system presents a comprehensive solution to address the limitations of previous designs.

In conclusion, this integrated system for simultaneous cultivation of soil biology and plants offers a versatile solution to the challenges of sustainable agriculture, rewilding, climate resilience, and landscape restoration. By combining efficient water use, support for soil ecosystem development, and adaptable plant cultivation areas, it provides a robust, scalable approach to enhancing biodiversity, improving agricultural outcomes, and fostering ecological resilience. The system's compatibility with methods for soil biology harvesting and local AMF propagation offers an innovative approach to ecosystem management. It serves as a holistic tool for promoting ecological restoration, carbon sequestration, and sustainable land management.

It shall be appreciated that the disclosed system and/or components of the disclosed system may have different configurations and ingredient formulations in alternate embodiments. It shall be appreciated that the components/ingredients of ecological system 100 described herein may comprise any alternative known materials in the field and be of any size and/or dimensions. It shall be appreciated that the components of ecological system 100 may be manufactured and assembled using any known techniques in the field. It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for cultivating compost, comprising:

arranging an ecosystem including composting zones and plant root zones around a subirrigation system; and using a wicking system for irrigation of the composting zones and simultaneous plant cultivation, wherein:

the subirrigation system includes one or more subirrigation pipes configured to receive water from a water supply line, the one or more subirrigation pipes further including access holes enabling passive transfer of water in the subirrigation pipes via the wicking system, a float valve tank assembly is coupled between the water supply line and a primary pipe in the subirrigation system, the float valve tank assembly configured to maintain a consistent water level in the one or more subirrigation pipes, the wicking system comprising wicking material in contact with the water in the subirrigation pipes and configured to draw water through the access holes to provide consistent moisture to compost in the composting zones and plant root zones; and aeration tubes comprising perforations are embedded within the composting zone and configured to maintain oxygen flow for aerating the composting zones, wherein the wicking material comprises potting material, the potting material being a soil mix contained within growbags that support plants, wherein the growbags are supported atop a perforated tray, the perforated tray being situated atop an access hole in the one or more subirrigation pipes and including a central aperture through which a meshed cup filled with the potting material extends into the water in the subirrigation pipe.

2. The method of claim 1, wherein the access holes are linearly arranged along a top surface of the one or more subirrigation pipes.

3. The method of claim 1, wherein the water source is a pressure line, or low pressure gravity source.

4. The method of claim 1, wherein the one or more subirrigation pipes are embedded within the compost.

5. The method of claim 1, wherein the aeration tubes are configured to promote an aerated static pile composting process in the compost, which, in combination with the wicking system, supports microbial activity and soil health.

6. The method of claim 1, the wicking material further comprising wicking fabric.

7. The method of claim 6, the wicking fabric including a portion that dips into water in the subirrigation pipe, and an expanded portion that spreads over the composting zone.

8. The method of claim 1, further wherein one or more support component elevates and stabilizes the one or more subirrigation pipes, float valve assembly, and aeration tubes within the composting zone.

9. The method of claim 1, wherein the ecosystem includes different plants that form a guild relationship with one another and with the compost in the composting zones.

10. The method of claim 9, wherein the different plants of the ecosystem comprise plants in growbags positioned over the access holes for drawing water from the subirrigation pipes.

11. The method of claim 10, further comprising cultivating and harvesting arbuscular mycorrhizal fungi (AMF) within the grow bags and compost for broader inoculation of soil and plant roots.

12. The method of claim 9, wherein the subirrigation system includes multiple pipes that are arranged to form a closed configuration around one or more of the different plants.

13. The method of claim 12, wherein the subirrigation system includes pipes arranged in a straight row connected to the closed configuration of pipes.

14. The method of claim 1, wherein the one or more subirrigation pipes are embedded within the composting zones such that the composting zones are in direct contact with surrounding soil.

15. The method of claim 1, wherein the growbags comprise a permeable fabric configured to permit moisture and biological exchange between the potting material and the composting zones.

* * * * *